United States Patent [19]

Brown et al.

[11] 4,243,392

[45] Jan. 6, 1981

[54] PROCESS FOR SOLAR CONCENTRATION OF LITHIUM CHLORIDE BRINE

[75] Inventors: Patrick M. Brown, Exton; Daniel A. Boryta, Downingtown, both of Pa.

[73] Assignee: Foote Mineral Company, Exton, Pa.

[21] Appl. No.: 28,976

[22] Filed: Apr. 11, 1979

[51] Int. Cl.$^2$ .......................... B01D 1/00; B01D 9/02
[52] U.S. Cl. ................................ 23/295 S; 23/302 R; 423/179.5; 423/499
[58] Field of Search .................. 23/295 S, 302 R, 307; 423/179.5, 499, 199

[56] References Cited

U.S. PATENT DOCUMENTS

| | | | |
|---|---|---|---|
| 3,268,289 | 8/1966 | Macey | 423/179.5 |
| 3,342,548 | 9/1967 | Macey | 423/199 |

OTHER PUBLICATIONS

Chem. & Eng. News, vol. 44, (1966), pp. 38 & 39, Reprint, ACS.
Chem. Eng., 8-15-1966, pp. 86-88, Reprint, McGraw-Hill.
Chem. Week, 5-14-66, Reprint, McGraw-Hill.

*Primary Examiner*—Bradley R. Garris
*Attorney, Agent, or Firm*—Howson and Howson; Rogers, Gordon S.

[57] ABSTRACT

By evaporation employing solar energy, a brine having a lithium chloride concentration greater than that of a brine whose vapor pressure under ambient conditions is substantially equal to the partial pressure of moisture in the atmosphere above the brine is obtained. The process by which such result is accomplished involves the use of a pond system consisting of a series of shallow ponds of relatively large surface area to which a dilute lithium chloride brine is introduced. The flow of the brine through the pond system is controlled so that, at a point intermediate the points of introduction of the brine to and withdrawal of the brine from the pond system, the concentration of the brine is such that its vapor pressure under ambient conditions is substantially equal to the partial pressure of the moisture in the atmosphere immediately above the pond system. This more concentrated brine is then caused to flow through the remainder of the pond system at a rate such that the temperature thereof, as a result of exposure to solar energy, exceeds that of the atmosphere above the pond system whereby additional water is evaporated from the brine to further increase the lithium chloride concentration of the brine. The concentrated lithium chloride brine is recovered and may be used to generate impure lithium chloride monohydrate or further purified to provide relatively pure anhydrous lithium chloride or the monohydrate.

6 Claims, 2 Drawing Figures

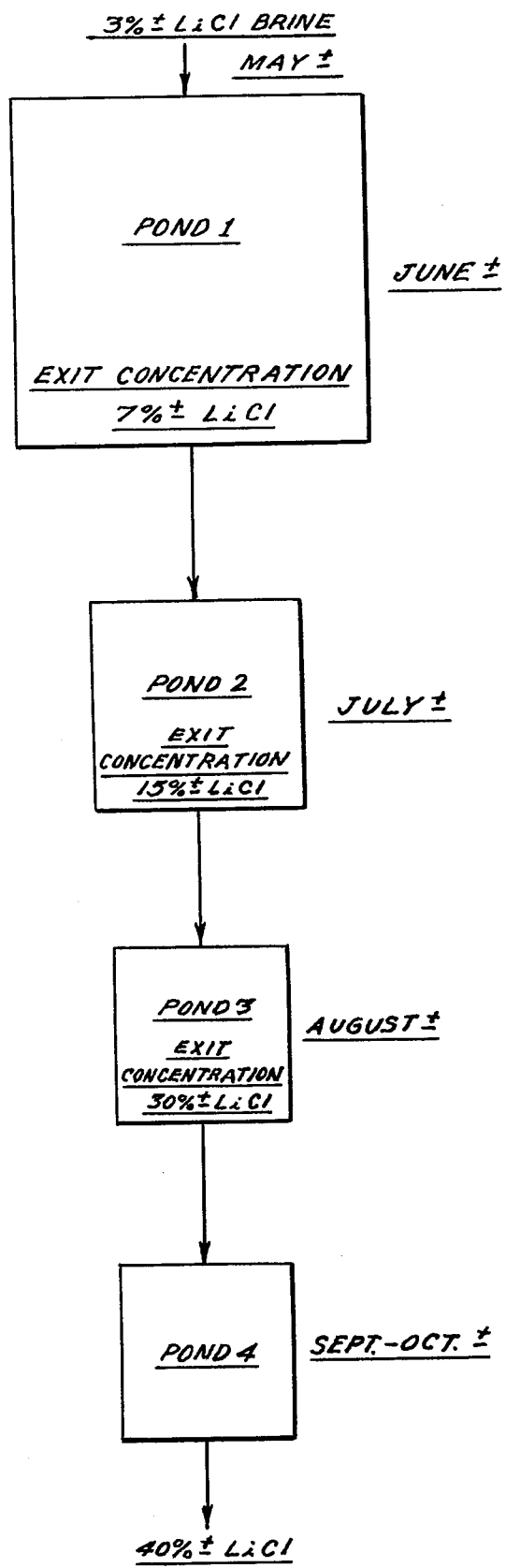
FIG. I.

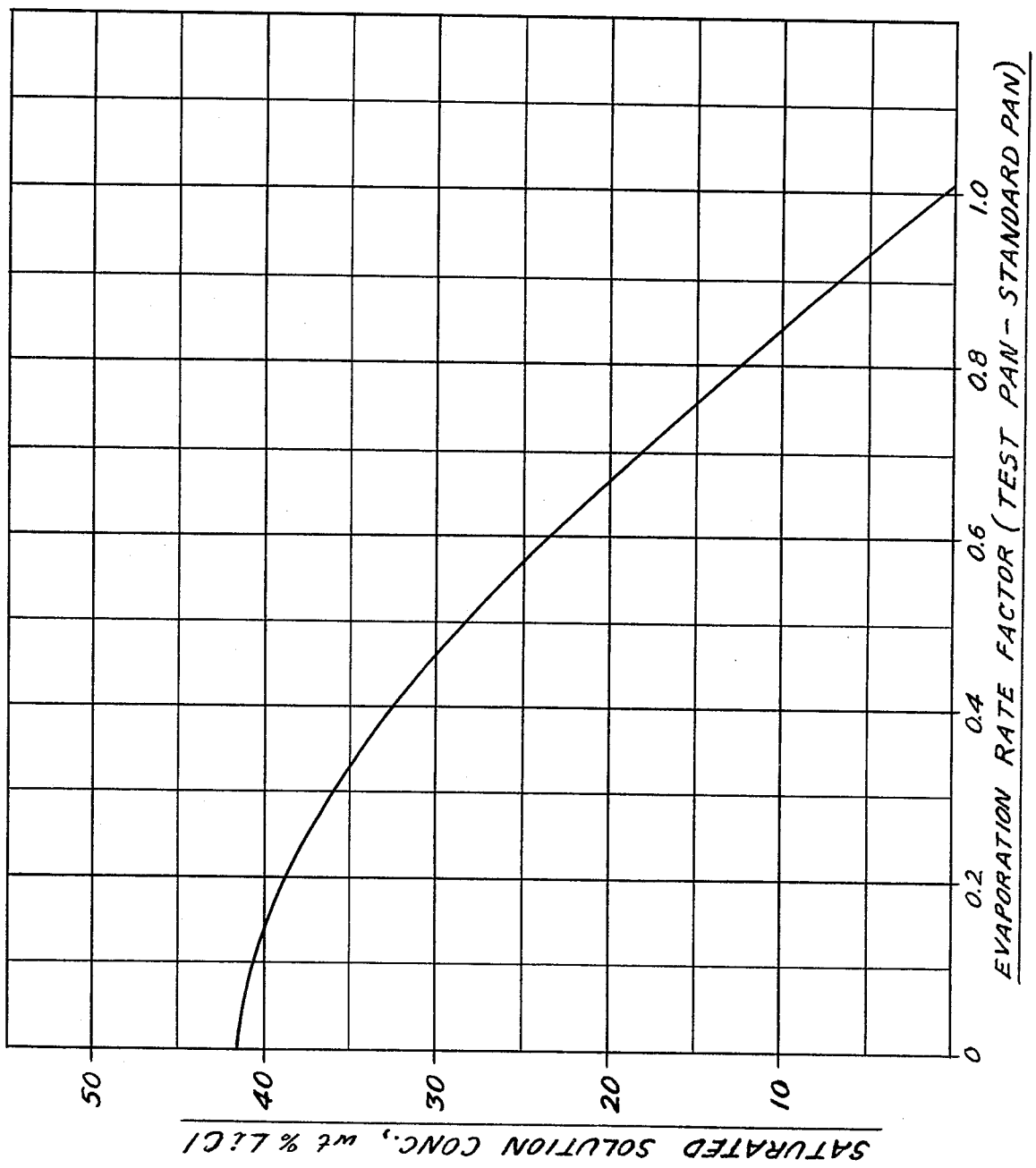
FIG. II.

PROCESS FOR SOLAR CONCENTRATION OF LITHIUM CHLORIDE BRINE

BACKGROUND OF THE INVENTION

Lithium metal has many uses and, to name a few, they include nuclear power application where a blanket of the liquid metal or its molten salts is used for breeding purposes in nuclear fusion reactors, in lightweight, compact lighium/sulfur batteries for electric cars and for power plant load leveling purposes, as a degasifier in the production of high-conductivity copper and bronze, and in the synthesis of compounds for use in the field of medicine.

Lithium metal is generally produced by electrolysis of an eutectic mixture of highly pure molten lithium chloride and potassium chloride.

There are naturally occurring brines in the United States which contain reasonable concentrations of lithium, in the form of the chloride, so as to be considered viable reserves for lithium recovery. Three particular sources include Searle's Lake, Calif., the Great Salt Lake, Utah, and Clayton Valley, Nev. The latter is the most economical source of lithium since the magnesium to lithium ratio is low, generally about 1.15:1, which allows for a simplified process of concentrating, purifying and recovering lithium chloride brine. Lithium carbonate is then obtained by treatment of the brine with soda ash.

To make lithium metal, the lithium carbonate is converted to lithium hydroxide via a liming process, and the latter compound in turn is converted to lithium chloride by treatment with hydrochloric acid followed by drying. This is a very circuitous and expensive route to lithium chloride, since lithium originally exists as the chloride in the natural brine. Thus, for many years there has been the need for a direct economical method for recovering lithium chloride as such from natural brines.

It is a primary object of the present invention to provide an economical method based on the use of solar energy for concentrating lithium chloride brines to a degree not heretofore obtained, including those brines which occur in nature.

Another object of this invention is to employ solar energy in such a way that brines of relatively low lithium chloride content may be concentrated to brines saturated with respect to such compound.

Still another object of this invention is to provide an integral step in an overall process for the economic recovery of high purity lithium chloride directly from naturally occurring brines.

These and other objects of this invention will become apparent from a consideration of this specification, appended claims and drawings in which:

FIG. I is a flow diagram showing a preferred embodiment of the present invention.

FIG. II is a graph in which average evaporation rate of concentrated brines is related to that of a standard pan.

DETAILED DESCRIPTION OF THE INVENTION

This invention is predicated on the discovery that lithium chloride brines can be concentrated by means of solar energy to produce brines saturated with respect to lithium chloride. The hindsight explanation of this unexpected result is set forth hereinbelow, and takes into consideration the carrying out of the involved process at a particular geographic location on the earth's surface, although it should be understood that the invention is not limited to any specific geographic area, provided there is adequate solar energy during a substantial portion of the year at the location.

Since 1965, Foote Mineral Company, Exton, Pa., has been producing lithium carbonate from a natural brine at Clayton Valley, Nev. The brine there available contains on the order of 200 to 400 ppm of lithium, present as lithium chloride. The ratio of magnesium to lithium is only about 1.15:1, and of potassium to lithium about 15:1. For this reason, lithium can be extracted as the primary product and magnesium and potassium discarded, although the latter metal could be recovered as potash if economics should justify the recovery of this potential by-product.

At Clayton Valley, saline brine is pumped from one or more operating wells and delivered to a pond system which covers over 1000 acres.

During concentration by means of solar energy, the brine is first held in a 650-acre pond until the lithium concentration increases from the initial 0.025%. The brine is then transferred to a 150-acre pond. After the concentration reaches 0.8%, the brine is transferred to several 50-acre ponds. En route, lime is added, and magnesium in the brine precipitates in an intermediate settling pond. This reduces the concentration of magnesium to 2 to 3 parts per million of brine.

Brine remains in the 50-acre ponds until the concentration of lithium chloride reaches 2%. It is then transferred to a seris of 10-acre ponds. As solar evaporation increases the concentration of lithium chloride to 3%, potassium chloride and sodium chloride precipitate. The concentrated brine, called bittern, is then pumped to the lithium carbonate mill.

In Table I below are set forth the average monthly temperatures and relative humidities at Clayton Valley, Nev., based on 10 year average maximum/minimum conditions.

TABLE I

| | Approximate Average Monthly Temperatures & Relative Humidities at Silver Peak, Nevada [1] | | | | | | | | | | | |
|---|---|---|---|---|---|---|---|---|---|---|---|---|
| Month | Jan | Feb | Mar | Apr | May | Jun | Jul | Aug | Sep | Oct | Nov | Dec |
| R.H. | 60.3 | 50.6 | 41.8 | 36.4 | 31.0 | 28.0 | 31.6 | 31.8 | 33.4 | 43.0 | 52.7 | 60.6 |
| Temp. °F. | 32.0 | 38.6 | 46.1 | 52.4 | 63.5 | 72.5 | 79.5 | 79.5 | 69.1 | 69.6 | 44.6 | 33.4 |
| Temp. °C. | 0 | 3.7 | 7.8 | 11.3 | 17.5 | 22.5 | 26.4 | 26.4 | 20.6 | 20.9 | 7.0 | 0.8 |

[1] Approximations were made based upon a 10 year average maximum/minimum condition at Silver Peak.

Table II below sets forth relative humidities above aqueous lithium chloride solutions of different concentrations calculated from vapor pressure over lithium chloride solutions divided by the vapor pressure of pure water at 10° C.=9.209 mm Hg, 20° C.=17.535 mm Hg, and 30° C.=31.824 mm Hg.

TABLE II

| Temp. °C. | Relative Humidities Above Aqueous LiCl Solutions of Different Concentrations Wt % LiCl: | | | | | | | | |
|---|---|---|---|---|---|---|---|---|---|
| | 5 | 10 | 15 | 20 | 25 | 30 | 35 | 40 | 45 |
| 10 | 91.2 | 84.7 | 77.1 | 68.4 | 56.5 | 44.5 | 32.6 | 21.7 | |
| 20 | 94.1 | 86.7 | 78.1 | 68.4 | 57.0 | 45.6 | 32.5 | 22.2 | 13.1 |
| 30 | 94.0 | 86.7 | 78.8 | 69.1 | 57.2 | 44.9 | 33.0 | 22.6 | 14.1 |

Given information on the average overall relative humidity of the air at a given location and time (see Table I), the final equilibrium concentration of a lithium chloride brine can be predicted. The rate of evaporation will be a function of temperature, the differential between the partial pressure of the water in the air and the equilibrium vapor pressure of the brine, and wind velocity.

By reference to Table I, one would predict the final equilibrium concentration of lithium chloride in the brine at Clayton Valley, Nev. would be about 24% lithium chloride in January/February, increasing to as high as 36% in June. An average concentration of about 31% would be expected to be obtainable during the eight month period of March to October.

However, it was discovered that the lithium chloride concentration of the brine through evaporation by means of solar energy could be further increased until a saturated solution was obtained. This result was unexpected since it had been thought that the maximum concentration obtainable would be that at which the vapor pressure of the brine was in equilibrium with the partial pressure of moisture in the air in contact with the pond system. What was discovered through careful temperature measurements of lithium chloride brines at Clayton Valley was that when the brine reached a concentration such that its vapor pressure was in equilibrium with the partial pressure of moisture in the atmosphere, the energy introduced from the sun's rays resulted largely in raising the temperature of the brine until the vapor pressure thereof exceeded the partial pressure of water in the air. As a result, further evaporation of water from the brine occurred and, in time, a brine saturated with respect to lithium chloride could be obtained. This result was particularly surprising since it was found that a brine saturated with respect to sodium chloride attained a temperature of only 80°-85°F. on the playa where the nominal atmospheric temperature was 98° F. By way of contrast, when subjected to the same conditions, a brine saturated with respect to lithium chloride reached a temperature as high as 115° F.

The following non-limiting examples are given by way of explanation.

EXAMPLE 1

A brine containing 23% lithium chloride was placed in a shallow 14"×28" pan and the brine was exposed to solar radiation over the summer. At the end of the evaporation season the sample was analyzed and found to contain 48.2% lithium chloride. The free liquid was decanted from the precipitated salts and centrifuged and a brine containing 45.6% lithium chloride was obtained. The solid precipitate analyzed 56.7% lithium chloride, and x-ray analysis revealed that the lithium chloride was in the form of the monohydrate.

EXAMPLE 2

Three test pans, 10', 7' and 4', respectively, in diameter, were used to concentrate lithium chloride brines by being set out on the playa at Clayton Valley, Nev., where they remained during the approximate period of early June through early October. The average lithium chloride concentration in the three test pans was permitted to vary between average minimum and maximum values by solar evaporation followed by dilution and further solar evaporation. The average minimum and maximum between lithium chloride concentration values are given in Table IV below:

TABLE IV

| Pan Size | LiCl Concentration | | Overall Average |
|---|---|---|---|
| | Min. (ave.) | Max. (ave.) | |
| 10' | 21 | 32 | 26 |
| 7' | 31 | 39 | 35 |
| 4' | 42 | 46 | 44 |

For the purposes of comparison, a standard 10' diameter pan containing a brine saturated with respect to sodium chloride and containing approximately 0.6% lithium chloride was set out on the playa and subjected to solar evaporation and dilution during the same period and in the same manner as the three test pans. FIG. II is a plot of the average evaporation rate of the test brines as related to the standard pan and is based on the data obtained in carrying out this Example 2.

Referring now to the drawing, there is illustrated a lithium chloride pond system comprising four ponds. However, it should be understood that a greater or lesser number of ponds can be utilized, and that the pond areas can vary considerably depending on such factors as the lithium chloride concentration of the feed brine, impurities in the brine and the need for chemical treatment to remove them, the atmospheric conditions at the site of the pond system, the lithium chloride concentration of the brine product, and the amount of brine product desired in a given period of time.

In the system of the drawing it is assumed that the brine feed to Pond 1 is typical of that produced from natural brine at Clayton Valley, Nev., which brine has heretofore been used for producing lithium carbonate. A representative composition of such brine, obtained by solar evaporation and certain chemical treatment as described hereinabove is set forth in Table III.

TABLE III

| Constituent | Weight Percent | |
|---|---|---|
| Li | 0.615 | (3.76% LiCl) |
| Na | 6.73 | |
| K | 4.82 | |
| Mg | 0.0022 | |
| Ca | 0.0080 | |
| B | 0.21 | |
| $SO_4$ | 2.22 | |
| Cl | 16.37 | |
| Br | 0.05 | |
| $H_2O$ | 66.56 | |

Such brines typically have a pH of about 9.6 and a specific gravity of about 1.241 at 23° C.

As can be seen by reference to the drawing, the sizes of the ponds vary, Pond 1 being the largest in area and Ponds 3 and 4 being the smallest. As would be expected, the larger the pond area, the greater will be the quantity of water evaporated for a given evaporation rate. Preferably, the pond sizes are selected so that in each pond the volume of brine is reduced by about one half due to solar evaporation during the period the brine remains in the pond.

In the drawing the brine entering Pond 1 has a lithium chloride concentration of about 3%. The brine is caused to flow into Pond 1 in late April or early May where it remains for close to two months during which time the volume of brine is reduced by about one half and the concentration of lithium chloride increases to about 7%. The brine is then transferred to Pond 2 where it remains for about a month and again the volume of brine is reduced by about one half so that the concentration of lithium chloride is increased to about 15%. The brine from Pond 2 is then transferred to Pond 3 where again it remains for about a month while further solar evaporation takes place to increase the lithium chloride content to 30%. Lastly, the brine from Pond 3 undergoes further solar evaporation in Pond 4 and a brine product having a lithium chloride content in excess of about 40% is obtained.

By conducting the solar evaporation in a plurality of ponds, losses of lithium chloride are minimized as compared to use of a single pond where lithium chloride at higher concentrations could be entrapped in unwanted salts (impurities) as they precipitate from the system.

It will be observed that by reason of the particular climate conditions at Clayton Valley, Nev., at an intermediate point in the pond system, possibly in Pond 3, but certainly in Pond 4, the concentration of the brine will be such that its vapor pressure will be in equilibrium with the partial pressure of moisture in the atmosphere above the pond system. By reason of the relatively shallow depth of the several ponds, especially those wherein the brine concentration is such that its vapor pressure is in equilibrium with the partial pressure of water in the atmosphere, the temperature of the brine, by reason of solar radiation, exceeds that of the atmosphere, whereby additional water is evaporated to raise the lithium chloride concentration of the brine. Typical pond depths for achieving such result are one foot or less.

The brine from the last pond containing 40% or more of lithium chloride may be subjected to a liquid-solids separation step, e.g. centrifugation or filtration, and the liquid may then be subjected to evaporation, preferably under vacuum to obtain a solid lithium chloride product which may be dried. Drying temperatures in excess of about 101° C., and preferably on the order of about 110° C., should be used in order to obtain anhydrous lithium chloride rather than the monohydrate.

The dry lithium chloride product may be used for various purposes depending upon its purity, which in turn will depend on the composition of the initial brine feed to the process and any purification steps to which the brine may have been subjected prior to, during or subsequent to the solar evaporation process to which this invention pertains.

In the case of a natural brine, such as that obtained at Clayton Valley, Nev., in the initial solar evaporation process to obtain a brine having a lithium chloride content of about 3%, the brine is limed to remove magnesium. Also substantial quantities of sodium and potassium chloride are precipitated as the solar evaporation progresses.

As noted above in the specific embodiment of the process as described in connection with the drawing, the brine feed was derived from a natural brine at Clayton Valley, Nevada, in which brine are present a number of impurities (see Table III).

According to copending application, Ser. No. 028975 filed Apr. 11, 1979, calcium chloride and slaked lime may be added to the brine feed prior to solar evaporation according to the present process in order to remove sulfate, magnesium, and boron impurities. Further purification of the anhydrous lithium chloride product obtained according to the present invention can be accomplished by heating the salt to a temperature above about 200° C., preferably to about 270°–325° C., followed by extraction with isopropanol. Such purification procedure is the subject matter of copending application, Ser. No. 028974 filed Apr. 11, 1979.

The anhydrous lithium chloride obtained through solar evaporation according to the present invention, purified as necessary, finds particular use in the electrolytic production of lithium metal whose various uses have been described above.

It is claimed:

1. In a process for producing a relatively concentrated solution of lithium chloride from a relatively dilute solution of such compund through evaporation by means of solar energy, the improvement which comprises providing a pond system consisting of a series of shallow ponds of relatively large surface area, flowing a dilute solution of lithium chloride into one end of said pond system, regulating the flow of said lithium chloride solution through said pond system so that through evaporation by means of solar energy the concentration of said solution, at a point intermediate the points of introduction to and withdrawal of said solution from said pond system, is increased to provide a solution whose concentration has a vapor pressure which under ambient conditions is substantially in equilibrium with the partial pressure of moisture in the atmosphere at the geographic location of said pond system, and further regulating the flow of said more concentrated lithium chloride solution through the remainder of said pond system so that through solar energy the temperature of said solution for at least a substantial portion of the daylight hours exceeds that of the air immediately above said pond system, whereby the vapor pressure of said solution exceeds the partial pressure of moisture in the atmosphere above said pond system and additional water is thereby evaporated from said solution to increase further the concentration of lithium chloride in said solution.

2. The process according to claim 1 in which evaporation of said lithium chloride solution by means of solar energy is continued until the concentration of lithium chloride exceeds about 40 percent by weight.

3. The process according to claim 2 in which said evaporation by means of solar energy is continued until a saturated solution of lithium chloride is obtained.

4. The process according to claim 1 in which said pond system comprises at least four ponds, and in which the rate of flow of the lithium chloride solution through said pond system is such that the concentration thereof after being subjected to solar radiation in each succeeding pond is about 1.2 times that of the immediately preceding pond to which it is connected in said pond system.

5. The process according to claim 1 in which the concentration of said lithium chloride solution is increased sufficiently to cause lithium chloride monohydrate to precipitate.

6. The process according to claim 5 in which lithium chloride monohydrate is recovered.

* * * * *